United States Patent [19] [11] 3,772,597
Stover [45] Nov. 13, 1973

[54] CODE TRANSMISSION SYSTEM

[75] Inventor: Harris A. Stover, Cedar Rapids, Iowa

[73] Assignee: Collins Radio Company, Dallas, Tex.

[22] Filed: May 19, 1972

[21] Appl. No.: 255,200

[52] U.S. Cl. .............. 325/38 R, 340/365, 178/17 C
[51] Int. Cl. .............................................. H04b 1/00
[58] Field of Search ................... 325/38 R; 340/365; 178/17 C, 81, 17.5; 179/90 K; 200/5 R, 5 A, 6 A

[56] References Cited

UNITED STATES PATENTS

| | | | |
|---|---|---|---|
| 3,457,368 | 7/1969 | Houcke | 178/17.5 X |
| 3,308,918 | 3/1967 | James | 178/17 C |
| 3,673,357 | 6/1972 | Molchan | 200/5 A |
| 3,227,820 | 1/1966 | Sorenson | 200/5 A |
| 2,957,952 | 10/1960 | Jaeger | 179/90 K |
| 3,596,181 | 7/1971 | Dowling et al. | 178/17 C |

*Primary Examiner*—Charles D. Miller
*Attorney*—Richard W. Anderson et al.

[57] ABSTRACT

A code transmission means comprising a compact keyboard of multi-functional keys and binary code word generation means compatible with handheld communication sets. Stored multibit code words for key selected symbols to be transmitted are addressed out of storage memory to provide time synchronous bit-rate code word modulation of a transmitter in automatic sequence following keyboard symbol selection. A teleprinter code transmission system is exemplifid.

4 Claims, 10 Drawing Figures

*SET-RESET KEYBOARD SWITCH CONTROLLED INPUTS PER TABLE 2

CODE TRANSMISSION SYSTEM

This invention relates generally to communication systems and more particularly to a code transmission system for handheld radio sets which requires a minimum of operator training.

BACKGROUND OF THE INVENTION

Binary coded communications employing numbers of teleprinter terminal units are currently used on trunk circuits between and among higher headquarters in military networks. The percentage of digital (coded) communications is growing rapidly on domestic common carriers. However, the advantages of coded transmission are not currently available to the user of small handheld or backpack radio equipments.

DISCUSSION OF PRIOR ART

In the past Morse code was a widely employed communication tool of field armies and even found use in some of the smaller operational combat units. The Morse code has been replaced by voice communications for nearly all applications requiring backpack or handheld portable equipment. The use of voice communications for a portable transceiver of communications offers the obvious advantage of minimal training requirement for the operator. While other reasons exist for the desirability of voice communications, and voice communications will surely continue to play an important role in man's activites, both civilian and military, code type communication does offer definite advantages for particular situations. Unfortunately with equipment presently available the use of coded type communications for lightweight portable hand sets would provide disadvantages which outweigh the advantages.

The major disadvantage of using Morse code in a military situation and, for that matter, in many civilian situations, is the serious difficulty in training the average individual to use the Morse code. With the consideration of short military enlistment times, the use of Morse code becomes completely unreasonable and the training problem alone is sufficient to rule out its general use. Another factor is the inconvenience of the hand key or other manual on-off switching arrangement utilized for generating the code. Although a keyed carrier would appear to be a simple method of communication, employing the ultimate in transmitter simplicity, the interface with the man which uses it is very inconvenient. Thus, speaking into a small microphone is so comparatively easy that it completely overcomes any advantage of Morse code transmission.

However, the use of coded transmissions other than Morse code transmissions provides certain definite advantages currently not available in the handheld or back set portable communications categories. Several advantages of coded transmissions of significance include a higher transmission rate for a given band width as compared to voice transmission, such that the transmission time-bandwidth product may be significantly conserved by replacing voice with code transmission. Further, voice transmission is much faster than the average person's ability to write, such that a somewhat slower transmission method than voice may be desirable whenever a written or printed record is to be kept. Under the same set of adverse conditions, the lower bandwidth required for code transmission normally makes it more reliable than voice transmission. For the same reason less transmitter power is required for code transmissions than for voice transmission. In certain circumstances, such as when a foot soldier may be on patrol in enemy territory, it may be impossible to speak into a microphone without the sound of the voice attracting attention, while a very brief coded transmission could go completely undetected. Since it is possible to trade bandwidth for transmission time, it is possible to transmit a short coded message of hundreds of letters or symbols in a fraction of a second using the same bandwidth required for voice communications.

GENERAL OBJECTS AND FEATURES OF THE INVENTION

In accordance with the present invention, and by removing the restrictiveness of Morse code transmission and providing means permitting use of other types of code, together with convenient keyboard concepts to be described, the primary objects of the present invention is providing a coded transmission system include (1) lower transmitter power requirements, (2) reduced bandwidth requirements, (3) a transmission technique more difficult for an enemy to intercept, (4) automatic production of multiple hard copies for use by a person receiving information from a mobile unit, (5) a system communication permitting transmission in close proximity with enemy troops without attracting attention such as would result from speaking into a microphone, (6) a system lending itself to easy implementation of many cryptographic techniques without increasing the transmission bandwidth, (7) a system compatible with existing voice transmisstion technology so that it can be employed to add new capability without detracting from present capability, (8) a system compatible with almost any of the different carrier frequency transmission bands such as LF, MF, HF, VHF, UHF, etc., (9) a system compatible with special signal commands or codes which might be read out of special read-only memories and transmitted in such a short period of time as to be virtually undetectable and jam-proof, (10) a system of communication permitting a flexibility of implementation leading to new operational concepts not presently considered because of nonavailability of necessary operational transmission equipment for field use.

The present invention is featured in the provision of a compact keyboard operated transmission system whereby keyboard depression addresses a read-only memory to read out under clock control (such as a clock rate compatible with current teletype communication systems) a coded binary transmission sequence which is transmitted at a synchronous and extremely rapid rate as concerns symbol rate and completely compatible with nonsynchronous operator command input thereto.

The present invention is further featured in a system of addressing a read-only memory for bit synchronous readout of an addressed multi-bit code word, which readout is effected automatically after the manually commanded addressing input to the system.

BRIEF DESCRIPTION OF THE DRAWINGS

These and other objects and features of the present invention will become apparent upon reading the following description with reference to the accompanying drawings in which.

GENERAL OPERATIONAL CONSIDERATIONS

WIth reference to the above discussed application concepts concerning the transmission system of the prsesent invention, a detailed embodiment to be described relates to a system which may be advantageously used by a soldier in the field with either a handheld radio or a backpack radio for communicating with headquarters. The system employes code transmission for communicating from the field to headquarters.

It may be undesirable for the soldier in the field with a handheld or backpack radio to possess a written record of communications because of the obvious aid it could provide the enemy should it fall into their hands. Secondly, since there will nearly always be more power available from headquarters to the foot soldier, voice transmission will be assumed for communication from headquarters to the field. Thirdly, hardcopy communications may be highly desirable in headquarters because of the requirement to distribute the copy to individual commanders and because of frequent relay requirements to higher headquarters. Thus for the particular application embodiment to be described, the transmitted code conveniently will be exampled as one compatible with standard start-stop teleprinter machines.

KEYBOARD CONSIDERATIONS

Figure 1:
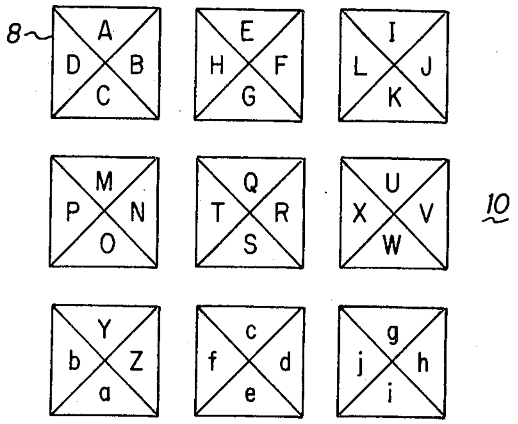
FIG. 1 is a diagrammatic representation of a compact keyboard array as might be employed in the present invention.

In the interest of portability, the standard teleprinter keyboard obviously is not adaptable for use in transmitting binary code transmission sequences from a small handheld or backpack radio set, which necessarily must have coding provisions with size, weight and convenience comparable with the voice microphone used in current portable radio sets. While a keyboard with a full complement of thirty two keys as would be employed in normal teleprinter application is impractical, an array of eight or nine keys is not impractical. Such an array of nine keys is illustrated in FIG. 1. Eight of these keys, such as typical key 8, may be used for the 32 standard teletype symbols and the ninth key might be used for special identification codes or predefined message sequences if desired. As more clearly illustrated in FIG. 2, each of the keys may be constructed to tilt to the right, left, forward or backward to provide four symbol selections per key.

Figure 2:
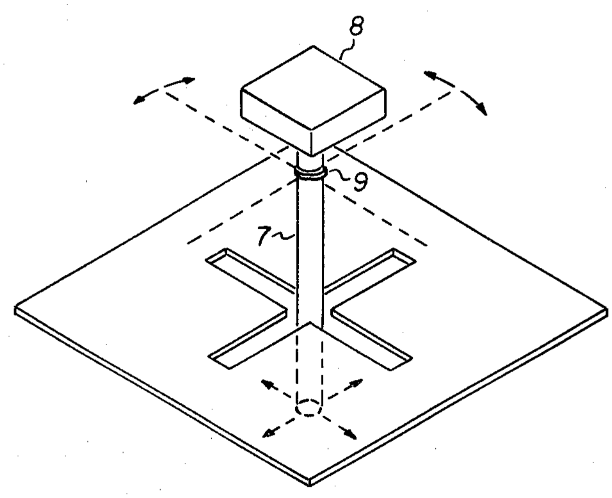
FIG. 2 is a diagrammatic representation of a physical key concept permitting four switch closure combinations per key.

With reference to FIGS. 1 and 2, each of the keys might be constructed with a generally concave surface such as typical key 8 and carry four character designations, such as A, B, C, D, respectively. Key 8, for example, might be constructed to pivot universally about a pivot point 9 with the key shaft 7 extending through and confined within an X-shaped slot to provide a physical arrangement permitting four distinct movements of the end of the shaft 7 depending upon which of the four possible directions the key is tilted. As will further be described, each of the keys with its associated shaft may be instrumental in "making" one of four selected switch connections (either single or multiple permutations) depending upon the direction in which the key is tilted.

The keyboard array depicted in FIG. 1 is capable of providing more functions than may be needed for a small mobile transmitting unit. For example, seven keys would provide all of the letters of the alphabet plus the "space" and one additional symbol. A functional unit of eight keys would provide a very compact and compatible keyboard arrangement with both a handheld radio and the standard teleprinter codes. Thus a great deal of versatility is provided by the tiltable keys. For example, the rather full keyboard capability of the FIg. 1 array provides for all capital letters, and the key function depicted by *a* might correspond to "space", with *b* corresponding to a "blank," *c* corresponding to "figures," *e* corresponding to "letters," *f* corresponding to "carriage return," and *g*, *h*, *i* and *j* might be employed or available for special identification codes or "canned" messages.

Although not specifically depicted in FIG. 2, such a keyboard might be designed with an interlock feature obviating the switch actuating tilt of more than one key at any instant. For example, the letters *b* and *h*, in the absence of a mechanical interlock or lock-out feature might conceivably be depressable at the same instant due to operator error in finger placement.

Figure 3:
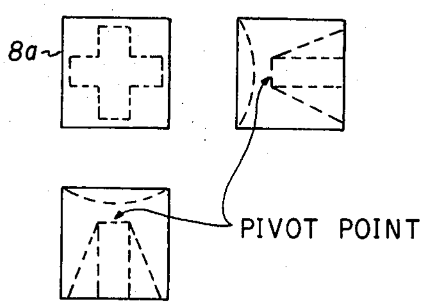
FIG. 3 is a further diagrammatic representation of a tilt key design as might be employed in the present invention.

FIG. 3 illustrates a physical arrangement of an alternative key concept which permits four different switch closure actions by tilting any key in any one of four directions. In FIG. 3 the head of the key is formed to provide an integral guide slot for left-right pivot and guide slot for forward-backward pivot such that the pivot shaft and guide fits up through the slot to provide a pivot point for the key to tip about and to constrain the key from tipping in two planes simultaneously.

The necessary keys can be oriented in a very compact array which is compatible with handheld radios. Likewise there are a large number of methods available for providing the actual switch "closures" with keys of the types depicted in FIGS. 2 and 3. For example, the movement of the key may cause a metal terminal mounted at a particular point on the key to make physical contact with a fixed metal terminal closing the particular circuit. Alternatively the movement of the key may cause it to physically move the movable leaves of a particular leaf-type switch, causing switch closure. In this regard, multiple leaves of such a switch might provide binary address coding associated with a particular key position. Further, a magnet associated with a particular position on the key may be brought close to a magnetic read type switch to cause switch closure. Similarly, motion of the key might cause a magnet to be brought near a semiconducting device sensitive to a magnetic field such as to cause a sufficient change in the conductivity of the semiconductor to be an effective switch activation in a particular application. Still further, the movement of the key may move an aperture to allow light to fall on a photosensitive device, etc. In any of the above discussed key physical arrangements, though not specifically illustrated, spring biasing means would be employed to hold the keys in neutral positions from which they may be tilted about either of two normal axes when any of the four code symbols associated with a particular key is selected for transmission.

Figure 4:
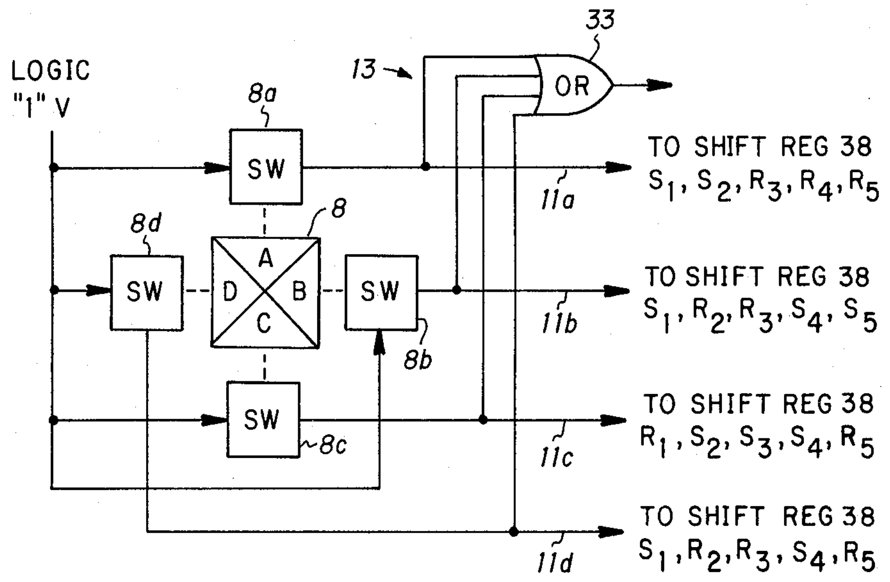
FIG. 4 is a functional diagram of key operated binary addressing logic as may be employed in the present invention.

For purposes of explanation of the specific embodiment to be described herein, the function of each of the keys is generally depicted in FIG. 4 as closing an associated one of four switches, depending upon the direction in which they key is tilted, and the closure of any one of the switches, such as switches 8*a* – 8*d* for typical switch 8, applies a logic 1 voltage source to a particular switch output line, the purpose of which will be further described in detail.

BASIC SYSTEM DESCRIPTION

Figure 5:
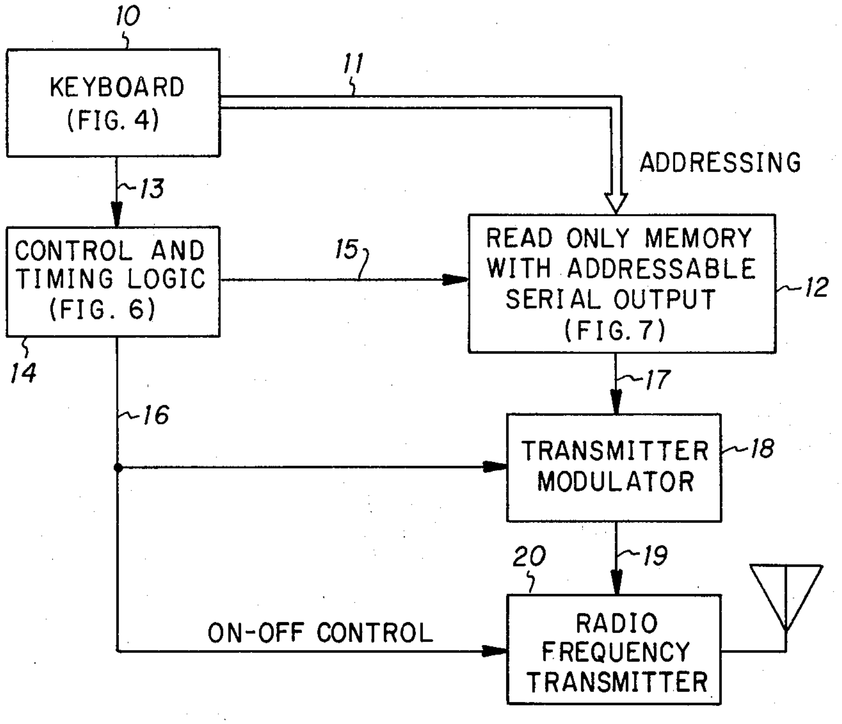
FIG. 5 is a general functional diagram of a transmission system in accordance with the present invention.

A functional diagram of a basic transmission system for use in a handheld or backpack code transmission system in accordance with the present invention is shown in FIG. 5. The keyboard 10 may consist of keys of the type shown in FIGS. 2 or 3 arranged in an array similar to that depicted in FIG. 1. The keyboard might also comprise, in general, any other arrangement providing the necessary number of switch closures related to the symbol transmission capability of a particular system. The number of switch closures might in general vary from a single switch closure for each selected character to be transmitted to a multiple section switch closure permutation providing a predefined multibit addressing word.

The closure of a particular switch (or switching means) associated with a particular key-selected character causes an associated binary address or logic 11 to be applied to a read-only memory 12 to cause read-only memory 12 to generate an output code definitive of the selected character. Timing and control of the output 11 of read-only memory 12 is provided by control and timing logic block 14. Control and timing logic block 14 provides the proper clock rate for the output 17 from the read-only memory 12. Timing and logic block 14 also activates transmitter modulator 18 and radio frequency transmitter 20 a brief but satisfactory length of time preceding the application of the output 17 from read-only memory 12. A switch closure (either single or multiple) on keyboard 10 activates the control and timing logic of block 14, which block in turn activates transmitter modulator 18 and radio frequency transmitter 20. The same switch closure on keyboard 10 additionally selects the address of the code corresponding to the selected character as it is stored in read-only memory 12. After a predetermined delay, control and timing logic 13 effects readout of output 17 from the selected address in read-only memory 12 to be applied to transmitter modulator 18.

Provided a subsequent switch closure on keyboard 10 occurs within a predetermined length of time, upon expiration of that predetermined time, control and timing logic block 14 effects turnoff of radio frequency transmitter 20 and, if desired, turnoff of transmitter modulator 18. Closure of character selecting switches on keyboard 10 in a comparatively rapid sequence will cause the radio frequency transmitter 20 to remain "on" continually during the transmission of the sequence of symbols. If desired, a separate switch might be provided to remove the on-off function of radio transmitter 20 and transmitter modulator 18 from the control of the timing and logic circuitries 14 and to provide independent manual control of the on-off function of the transmitter modulator 18 and the radio frequency transmitter 20 by separate switching means completely independent of the switches of keyboard 10.

The general transmission system depicted in FIG. 5 may embody a modulator 18 employing subcarriers in the audio frequency range that are modulated by the code output of read-only memory 12. While the block diagram of FIG. 5, in depicting the general transmission system, depicts a serial output 17 from read-only memory 12, the system may be compatible with a parallel output and in certain applications it may be desirable to employ parallel output with a separate subcarrier frequency for each bit of the code symbol to be transmitted.

By employing audio subcarriers in modulator 18, the system may be used for voice communications when it is not being used for coded transmission. This may be accomplished by deactivating the subcarriers and supplying the voice signals to the transmitter modulator 18. The general system of FIG. 5 is further compatible with a wide variety of forms of modulation of radio frequency transmitter 20, including AM, FM, PM, SSB, etc.

Thus, in general, a transmission system in accordance with the present invention comprises a multi-key keyboard individually depressed keys of which effect address of an assigned binary multi-bit code word in a read-only memory and provide a binary output code word for the system modulator for subsequent transmission on a synchronous clock defined basis, all in an automatic fashion such that synchronous transmission is effected as concerns code word bit rate in response to random, relatively slow, and variable rate symbol selection by the operator on the keyboard 10.

DETAILED DESCRIPTION OF TELEPRINTER CODE EMBODIMENT

Figure 6:
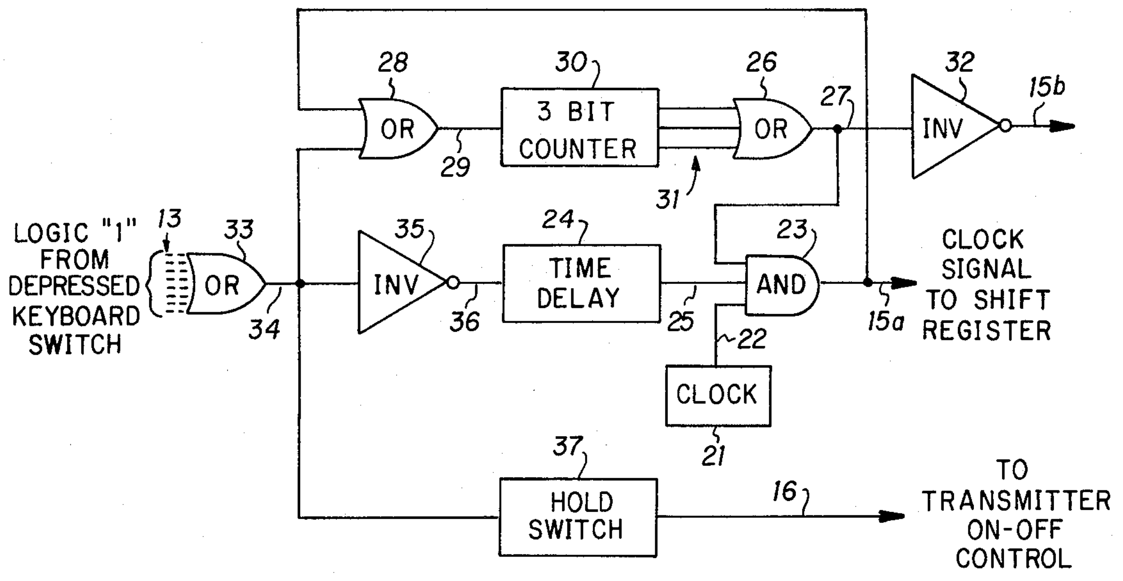
FIG. 6 is a functional diagram of a control logic functional block as might be employed in the transmission system of FIG. 5.
Figure 7:
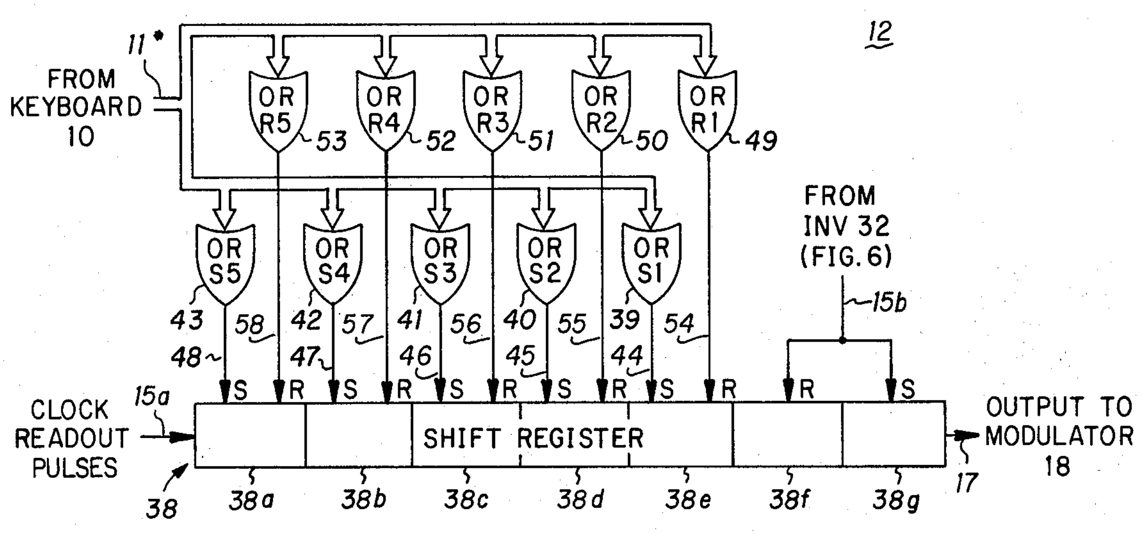
FIG. 7 is a functional diagram of a read-only memory which might by employed in the transmission system of FIG. 5.

FIGS. 6 and 7 illustrate specific embodiments of read-only memory 12 and the control and timing logic block 14 of the general system of FIG. 5 to arrive at a system for transmission of standard 7-bit start-stop teleprinter code. With reference to FIG. 6, a master clock 21 provides a timing base for the system. The associated logic circuitry in FIG. 6 provides a controlled clock signal output 15*a* for readout of the system read-only memory, a logic output 15*b* employed in "addressing" of the system read-only memory, and a keyboard activated transmitter on-off output control 16.

As depicted in 4, depression of any keyboard switch during character selection connects a logic 1 voltage source V to an OR gate 33 so as to provide a logic 1 output 34 from OR gate 33. The control logic of FIG. 6 includes OR gate 33 with the logic 1 inputs 13 as would be applied in response to depression of any one of the keyboard switches to any one of its four assigned characters.

Depression of any one of the keyboard switches to any one of its assigned characters additionally provides an assigned permutation of logic 1 outputs for application to the read-only memory of the system (such as lines 11*a–d*, FIG. 4). Read-only memory 12 comprises a shift register which is "addressed" by application of the key initiated logic 1 output permutation to effect certain set and reset functions within the shift register. The "addressing" provided by the keyboard 10 thus comprises a hard-wired arrangement of the logic 1 available at the instant of key depression to an assigned permutation of set and reset terminals of the shift register for each character selected for transmission.

The input 13 to the control and timing logic block 14 from keyboard 10 is embodied in FIG. 6 as a logic 1 in response to, and for the duration of, a switch closure effected by keyboard depression. The output 34 from OR gate 33 is applied through a logic inverter 35 to provide an inverted output 36 (logic 0) through a time delay means 24 as a first input 25 to an AND gate 23. Output 34 from OR gate 33 is additionally applied as a first input to a further OR gate 28 a second input to which comprises the output 15*a* from AND gate 23. The output 29 of OR gate 28 is applied as input to a 3-bit counter 30 the collective bit outputs 31 of which are applied as respective inputs to a further OR gate 26. The output 27 from OR gate 26 is applied as a second input to AND gate 23 through which clock pulses 22 from clock source 21 are gated to clock output line 15*a*. Output 27 from OR gate 26 is additionally applied through a further logic inverting means 32 to provide an output 15*a* for "addressing" the read-only memory (shift register 38 in the embodiment here described) to establish the start-stop bit logic elements associated with teleprinter 7-bit code. The output from OR gate 33 is additionally illustrated in FIG. 6 as being applied through a hold switch 37, which may be of the instant on-delayed off type to provide a controlling output 16 to the on-off control of the radio frequency transmitter 20 of the system.

With reference to FIG. 7, the read-only memory 12 of the system is embodied as a 7-bit shift register 38. The gated clock pulse train 15*a* from AND gate 23 of FIG. 6 is applied to shift register 38 as a shift input to shift the code symbols out of the shift register in a serial manner. The "addressing" depicted as output 11 from keyboard 10 in the general system of FIG. 5 comprises particular permutations of logic inputs to each of a plurality of OR gates 39 – 43 and 49 – 53, the outputs of which are effective in setting or resetting an associated one of the first five stages 38*a* – 38*e* of shift register 38. Thus, depression of a key on keyboard 10 to select a given character to be transmitted (see FIG. 4) applies a logic 1 to an associated output line 11 which is in turn applied as input to a permutation of particular ones of the set and reset OR gates of FIG. 7. For example, with reference to FIG. 4, keyboard selection of the character A applies a logic 1 to the input of the OR gates of FIG. 7 designated S1, S2, R3, R4 and R5. The S and R designations are definitive of whether the logic application effects a set or a reset of the associate one of the stages of shift register 38 to which the output of the OR gate is wired. The output stage 38*g* and the next preceding stage 38*f* of shift register 38 have applied thereto respective set and reset logic by the output 15*b* of inverter 32 of FIG. 6. It might be generally stated that standard start-stop teleprinter code is a 7-bit code comprised of a start pulse followed by five character defining bits of assigned binary logic permutations and concluded with a stop pulse. Thus shift register 38 of FIG. 7 has an appropriate logic level set into the output stage 38*g* and the preceding stage 38*f* to provide, in conjunction with the control and timing logic means, the "start" and "stop" logic bits of the standard teleprinter code for each character selected for transmission. Depression of a character selecting key establishes binary levels in the first five (character defining) stages 38*a* – 38*e* of shift register 38 in accordance with the standard logic permutations assigned to each character in standard teleprinter code.

As generally described above, the 7-bit teleprinter code transmission embodiment employs a logic control and timing means as depicted in FIG. 6 together with a read-only memory with "addressable" serial outputs embodied as a shift register successive stages of which are set or reset at the time of keyboard character selection to respective binary states characteristic of (assigned to) the characters to be transmitted.

OPERATION OF SPECIFIC EMBODIMENT

In operation, the standard start-stop teleprinter transmitting embodiment employing the logic and switching means of FIGS. 6 and 7 causes a clock synchronous bit rate output of the code word assigned a selected character to be transmitted upon the closing of an associated switch on the keyboard 10. The closure of any switch (with reference to FIG. 4) produces a logic 1 on output 34 of OR gate 33 of FIG. 6. The occurrence of a logic 1 at the output 34 of OR gate 33 performs multiple functions. A logic 1 output is applied to activate hold switch 37 through which the transmitter 20 is turned on. The logic 1 appearing on the output 34 of OR gate 33 is applied through OR gate 28 to a 3-bit counter 30 to move the counter 30 out of its normal "rest" state consisting of all logic 0's. When 3-bit counter 30 is out of its "rest" state, the bit outputs 31 provide an enabling logic 1 signal 27 to appear at the output of OR gate 26. This enabling signal 27 (logic 1) is applied as a first input to AND gate 23. When the keyboard switch is released by the operator, the output 34 of OR gate 33 returns to logic 0, causing a logic 1 to appear at the output 36 of inverter 35. Following a delay established by time delay 24 this logic 1 is applied (line 25) as a second input to AND gate 23 which is then enabled to pass clock pulses 22 from master clock 21 on line 15*a* to shift register 38 of FIG. 7.

Assuming that shift register 37 has been preset to contain (store) a particular binary code word, the application of clock pulses on line 15*a* as a shift input to shift register 38 effects a serial readout 17 from shift register 38 of the binary word stored in the shift register. Output 17 from shift register 38 (FIG. 5) is applied to the transmitter modulator 18 to effect transmission by any one of the above discussed types of modulation in accordance with the binary word input applied to the modulator.

Hold switch 37 (FIG. 6) is an instant-on, delayed-off switch which turns the transmitter 20 on immediately following closure of a keyboard switch, and holds the transmitter on for a time period long enough to assure that the code symbol has been transmitted. Hold switch 37 remains in the "on" state a length of time following the last logic 1 input 34 from OR gate 33 so that if the operator is activating keyboard switches in a rather rapid sequence, the transmitter 20 will remain on without interruption.

The time delay 24 is included to allow sufficient time for a receiver to receive an unmodulated carrier to allow its circuits such as AGC to function prior to actual transmission of the modulated code intelligence, which transmission occurs upon readout of the shift register 38 to the transmitter modulator. As such,time delay 24 may be selectively tailored to a particular receiver-transmitter combination, or omitted as desired.

The 3-bit counter 30 of the timing and logic circuitry of FIG. 6 uniquely provides a clock rate synchronous readout of shift register 38 for the stored 7-bit teleprinter code word. The relationship between the particular count contained within 3-bit counter 30 and its timing control relationship as concerns the shifting of code bits out of register 38 and controlling the application of clock pulses thereto to effect such shifting is depicted in Table 1 below.

Counter 30 has, by definition, eight states as indicated in Table 1, below. The 000 state in the embodiment under consideration is termed the "rest" state.

TABLE 1

| 3-bit Counter 30 State | Output Stage of Shift Register 38 | Conditions of AND gate 23 relative to clock pulses 22 | |
|---|---|---|---|
| 0 0 0 | 1 (STOP) | INHIBIT | (stop/rest) |
| 0 0 1 | 1 (STOP) | PASS | (ready) |
| 0 1 0 | 0 (START) | PASS | (start) |
| 0 1 1 | 1st info bit | PASS | (info) |
| 1 0 0 | 2nd info bit | PASS | (info) |
| 1 0 1 | 3rd info bit | PASS | (info) |
| 1 1 0 | 4th info bit | PASS | (info) |
| 1 1 1 | 5th info bit | PASS | (info) |

AS 3-bit counter 30 goes from its full count of 111 to the 000 count, the resulting zero logic output level from OR gate 26 is inverted by inverter 32 to a logic 1 on line **15*b* which effects setting a logic 1 in the output stage 38*g* of shift register 38 and resetting a logic 0 in the next preceding stage 38*f* of shift register 38. Thus in the 000 state, the 1 of the teletype "stop" signal is fed to the transmitter modulator 18 from the output 17 of shift register 38 of FIG. 7.**

Activating any switch of keyboard 10 will introduce a count through OR gates 33 and 28 into 3-bit counter 30 to put it in the 001 state. As long as counter 30 is in any state that contains a 1 the clock pulses 22 from clock 21 will be passed from AND gate 23 provided there is a logic 1 at the output of time delay 24.

The first clock pulse to pass AND gate 23 on line **15*a* will shift the "start" pulse (a logic 0) into the output stage 38*g* of shift register 38 of FIG. 7, and this same first clock pulse will advance counter 30 to state 010. Each of the next five clock pulses appearing on line 15*a* will shift a successive one of the five information bits contained in the code into the output stage 38*g* of shift register 38 and add one more count in 3-bit counter 30. Thus the 000 state of 3-bit counter 30 is in the "rest" state as depicted in Table 1. The 001 state of 3-bit counter is the "ready" state waiting for the first clock pulse to pass AND gate 23, which passage will shift the "start" bit (a binary 0) into the output stage 38*g* of shift register 38 (FIG. 7) and at the same time advance 3-bit counter 30 to the 010 state. Thus the 010 state of 3-bit counter 30** is in the "start" bit state.

The next successive one of clock pulses 22 to pass AND gate 23 shifts the first information bit of the code into the output stage **38*g* of shift register 38, and additionally places 3-bit counter 30 in the 011 state. The 011 state of 3-bit counter 30** is the first information bit state.

Following on with the above described operational procedure, Table 1 is formulated, showing each state of counter 30 and the corresponding output of shift register 21 during that state, along with the condition of AND gate 23 relative to clock pulses 22 during that state. The clock pulse occurring during the 111 state of 3-bit counter 30 returns 3-bit counter 30 to the 000 ("rest") state readying the system for the next symbol key to be depressed. The 000 in 3-bit counter 30 causes a binary 0 to appear at the output 27 of OR gate 26, resulting in a logic 1 at output **15*b* of inverter 32, which puts a "stop" bit (a binary 1) in output stage 38*g* of shift register 38, and additionally places a "start" bit (a binary 0) in stage 38*f* next preceding the output stage 38*g* of shift register 38. The 000 state of 3-bit counter 30 is detected by OR gate 26 which, as a result of a binary 0 appearing as output, inhibits AND gate 23 from passing additional clock pulses to either shift register 38 or 3-bit counter 30 until another switch on keyboard 10 is closed. Thus, as 3-bit counter 30** runs through its eight successive states or counts, the system completes the transmission of one symbol and returns to a "rest" condition waiting for the next symbol to be activated by closure of a keyboard switch.

Figure 8:
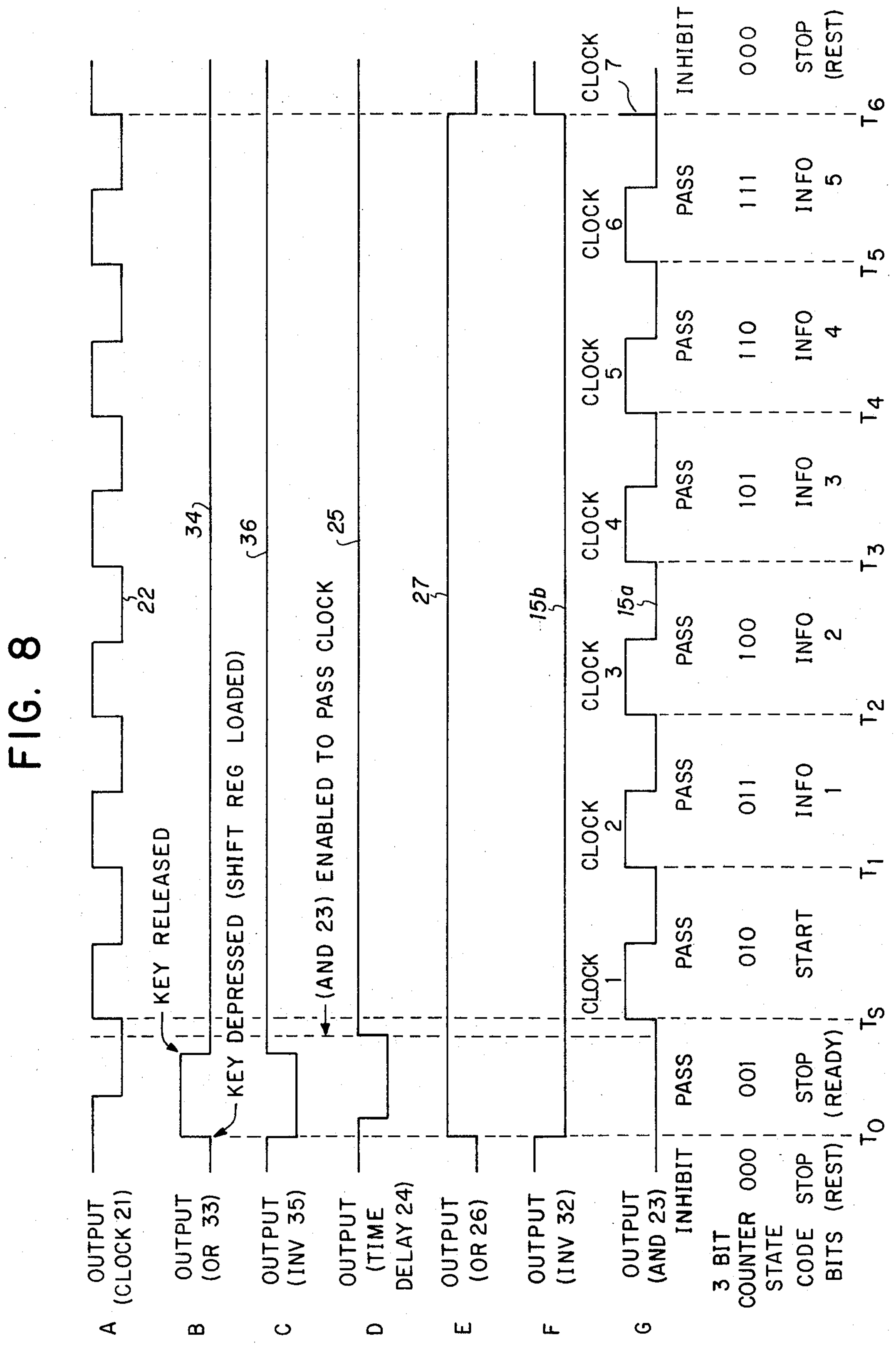
FIG. 8 is a diagrammatic representation of operational waveforms of an embodiment of the invention as depicted in FIGS. 4, 5, 6 and 7.

FIG. 8 depicts operational waveforms concerning the above described operation of the control logic and timing logic system of FIG. 6. Waveform A of FIG. 8 depicts timing pulses 22 from the master timing clock 21. Waveform B depicts the output 34 from OR gate 33 occurring in response to key depression and release by the operator when selecting a symbol to be transmitted. Waveform C illustrates the inverted waveform 36 which comprises the output from inverter 35. Waveform D illustrates the inverted waveform 36, of waveform C as delayed, by some predetermined delay factor, in time delay 24. Waveform E depicts the output of OR gate 26 which goes from binary 0 to binary 1 at the instant of key depression ($t_0$) due to the 3-bit counter 30 being driven off the rest (000) state. Waveform F represents the inverted output **15*b* from OR gate 26 as applied from inverter 32 to effect setting a binary 1 in the output stage 38*g* of shift register 38 and a binary 0 in the preceding stage 38f of shift register 38 to complete this portion of the code word "addressing." Waveform G illustrates the passage of clock pulses on line 15*a* to shift the binary word out of shift register 38 beginning at the time occurrence ($t_s$) of the first clock pulse following the enablement of AND gate 23. FIG. 8 further illustrates the inhibiting and passing functions of AND gate 38 as concerns clock pulses, the corresponding count state of 3-bit counter 30,** and the corresponding code bits of the teleprinter code word to be transmitted at times $t_1 - t_5$.

Operational description thus far has been based on the assumption that a desired code word is stored or held in the shift register at the time clock pulses are applied for readout. In the described embodiment the "addressing" generally depicted by output 11 from keyboard 10 in FIG. 5 is applied to a read-only memory 12 which may be embodied as a shift register (or other suitable means may be used) and the "addressing" is accomplished in conjunction with the afore described control and timing logic of FIG. 6 in a fixed-wire fashion. The particular code associated with a particular keyboard switch is determined by which ones of the plurality of OR gates of FIG. 7 (S1 – S5 and R1 – R5) are connected to receive a logic 1 input from the particular depressed switch. The control circuitry 14 of FIG. 6 provides the insertion of "start" and "stop" logic into the proper locations (stages 38*f* and 38*g*) of shift register 38 at the proper time, as previously discussed. The keyboard switches, with appropriate interwiring to the OR gates (S1–S5 and R1–R5) of FIG. 7, insert (when closed at time $t_0$) the corresponding code ifnormation bits into the proper locations of shift register 38. When these bits are subsequently clocked out of the shift register 38 at the proper rate (clock defined) they provide a standard start-stop teleprinter code, provided the OR gates R1–R5 and S1–S5 are wired to the keyboard switches as indicated by Table 2 below.

TABLE 2

| Lead from Keyboard Switch | OR gates of FIG. 7 to which lead connects | 5-Bit character definition into Shift Register **38** upon key depression |
|---|---|---|
| A | S1, S2, R3, R4, R5 | 1 1 0 0 0 |
| B | S1, R2, R3, S4, S5 | 1 0 0 1 1 |
| C | R1, S2, S3, S4, S5 | 0 1 1 1 0 |
| D | S1, R2, R3, S4, R5 | 1 0 0 1 0 |
| E | S1, R2, R3, R4, R5 | 1 0 0 0 0 |
| F | S1, R2, S3, S4, R5 | 1 0 1 1 0 |
| G | R1, S2, R3, S4, S5 | 0 1 0 1 1 |
| H | R1, R2, S3, R4, S5 | 0 0 1 0 1 |
| I | R1, S2, S3, R4, R5 | 0 1 1 0 0 |
| J | S1, S2, R3, S4, R5 | 1 1 0 1 0 |
| K | S1, S2, S3, S4, R5 | 1 1 1 1 0 |
| L | R1, S2, R3, R4, S5 | 0 1 0 0 1 |
| M | R1, R2, S3, S4, S5 | 0 0 1 1 1 |
| N | R1, R2, S3, S4, R5 | 0 0 1 1 0 |
| O | R1, R2, R3, S4, S5 | 0 0 0 1 1 |
| P | R1, S2, S3, R4, S5 | 0 1 1 0 1 |
| Q | S1, S2, S3, R4, S5 | 1 1 1 0 1 |
| R | R1, S2, R3, S4, R5 | 0 1 0 1 0 |
| S | S1, R2, S3, R4, R5 | 1 0 1 0 0 |
| T | R1, R2, R3, R4, S5 | 0 0 0 0 1 |
| U | S1, S2, S3, R4, R5 | 1 1 1 0 0 |
| V | R1, S2, S3, S4, S5 | 0 1 1 1 1 |
| W | S1, S2, R3, R4, S5 | 1 1 0 0 1 |
| X | S1, R2, S3, S4, S5 | 1 0 1 1 1 |
| Y | S1, R2, S3, R4, S5 | 1 0 1 0 1 |
| Z | S1, R2, R3, R4, S5 | 1 0 0 0 1 |
| Space | R1, R2, S3, R4, R5 | 0 0 1 0 0 |

Table 2 indicates (for purposes of example) a lead from the keyboard switch associated with each of the letters of the alphabet plus a space function being wired as an input to permutations of the OR gates S1–S5 and R1–R5 of FIG. 7. When a particular keyboard switch is depressed, a logic 1 is applied to effect either a set or reset function in an assigned one of the OR gates associated with the first five stages 38*a* – 38*e* of shift register 38. Thus, depression of the keyboard switch A applies a logic 1 to OR gates S1, S2, R3, R4 and R5, as above described with reference to FIG. 4. The outputs 44 – 48 of the S OR gates 39 – 43 are applied to "set" input terminals of the first five stages of the shift register while the outputs 55 – 58 of the OR gates 49 – 53, designated R, are applied to respective "reset" input terminals. Thus, in general, binary 1 outputs of these OR gates designated S5, S4, S3, S2 and S1 set the corresponding stages of the shift register 38 to the binary 1 state while binary 1 outputs of those OR gates designated R5, R4, R3, R2 and R1 reset the corresponding stages of the shift register 38 to the binary 0 state. Inputs to the OR gates of FIG. 7 are collectively indicated by reference numeral 11, it being realized that the inputs are hard-wired connections to switches associated with particular ones of the keyboard switches, such as depicted for the characters A, B, C and D in conjunction with associated keyboard switches 8A – 8F of FIG. 4. With reference to FIG. 4 and Table 2, it is seen that depression of switch 8 to the character A position effects the closure of switch 8*a* to provide a logic 1 output 11*a* to each of the OR gates designated S1, S2, R3, R4 and R5. This action assures the setting of the shift register stages 38*a* and 38*b* to a binary 1 state and the resetting of the shift register stages 38*c*, 38*d*, and 38*e* to a binary 0 state. Correspondingly, depression of keyboard switch 8 to either of the three remaining possible positions causes a binary 1 logic level to be applied through the associated switch 8*b* – 8*d* as multiple inputs to particularly different preassigned permutation of the set and reset OR gates of FIG. 7. Table 2 further indicates the 5-bit character defining bits placed into the shift register upon depression of the corresponding keyboard switch.

As previously discussed, the "start" and "stop" bit preassigned logic levels are set into the last and next preceding stages of shift register 38 upon counter 30 going from 111 to 000 via a binary 1 output from inverter 32 of FIG. 6 which assures the setting of a binary 1 in the output stage 38*g* of shift register 38 and the resetting of a binary 0 in the next preceding stage 38*f*.

The clockout rate of the code bits inserted into the shift register 38 upon key depression are defined by the rate of the master system clock 21 and may be adjusted as appropriate to provide a standard start-stop teleprinter cod such that, although the code symbols may be transmitted at a relatively slow average rate, each individual symbol will be transmitted with a code bit rate compatible with 60 WPM, 75 WPM or 100 WPM teleprinter receiving equipment.

In the above described embodiment, the selected symbol is sequentially encoded into the shift register and synchronously read out at a rapid clock rate for each selected symbol to be transmitted. Clock rates may therefore be selected to insure the complete transmission of one selected code symbol prior to the depression of a subsequent key to transmit a following symbol.

TRANSMISSION SYSTEM WITH TEMPORARY MEMORY

Figure 9:
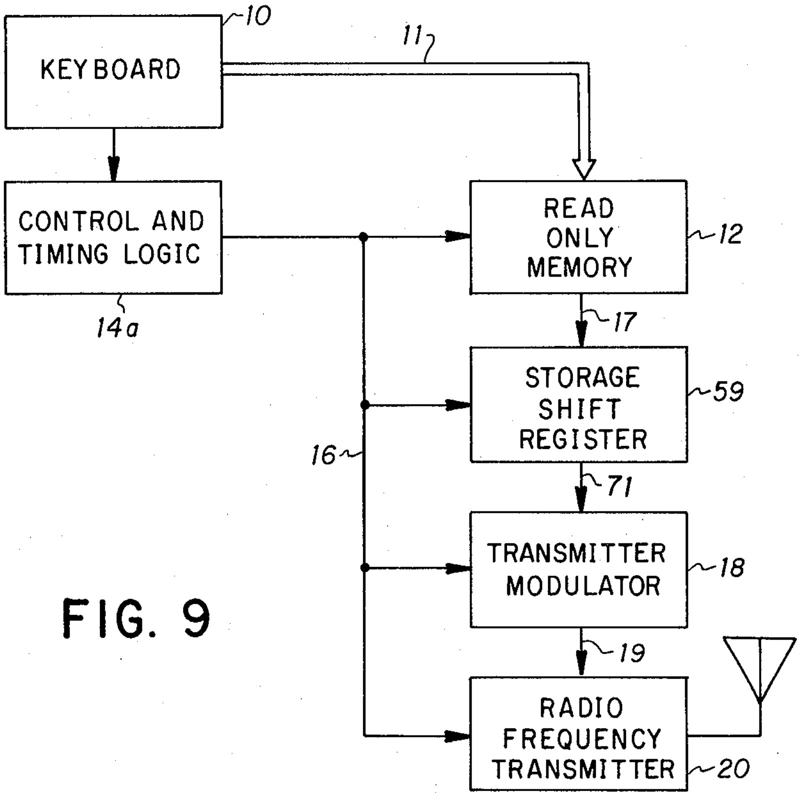
FIG. 9 is a functional diagram of a further transmission system with provision for temporary memory.

Because the transmission of the assigned code word occurs automatically after the selection of each character to be transmitted in the above defined system, the system might be defined as a transmission system without temporary memory. It may be advantageous in certain instances to provide a system with temporary memory which differs from that generally depicted in FIG. 5 by the inclusion of a storage shift register as depicted functionally in FIG. 9. With reference to FIG. 9, a storage shift register 59 receives inputs from read-only memory 12 in the form of encoded symbols to be transmitted along with a timing and logic input from control and timing logic block 14. The output 71 from storage shift register 59 applies an input to the transmitter modulator 18 for subsequent transmission by radio frequency transmitter 20. The system of FIG. 9 requires some additional complexity of the control and timing logic block. The keyboard 10, as in the previous discussion, provides the interface with the operator.

The read-only memory 12 stores the binary 1 and binary 0 coding information for each symbol. The storage shift register 59 may be provided with sufficient length to store a message rather than a single character. For example, a 1024-bit shift register can store 146 teleprinter symbols of 7-bits each equivalent to about 29 5-letter words. Thus in the system of FIG. 9, the control and timing logic of block 14 controls the loading of the symbols into the storage shift register 59 as they are selected by the keyboard and converted into the appropriate binary word by read-only memory 12. This may be accomplished serially by clocking the symbols into storage shift register 59 by bursts similar to the description of the outputs from shift register 38 of FIG. 7, or it may be accomplished in a parallel manner, one letter at a time, depending upon the characteristics of the particular shift register selected and the control logic provided. In the system of FIG. 9, when the storage shift register 59 has been fully loaded, the operator might activate a "transmit" key on the keyboard which activates the RF transmitter 20 and dumps storage shift register 59 into transmitter modulator 18 at a high serial bit rate. Thus, were a 1024-bit storage register employed as the storage shift register 59, and dumped at a rate of 3072-bits per second, the entire message would be dumped in one-third second. Alternatively, a message stored in a 512 bit register 59 might be dumped in one-sixth second.

Figure 10:
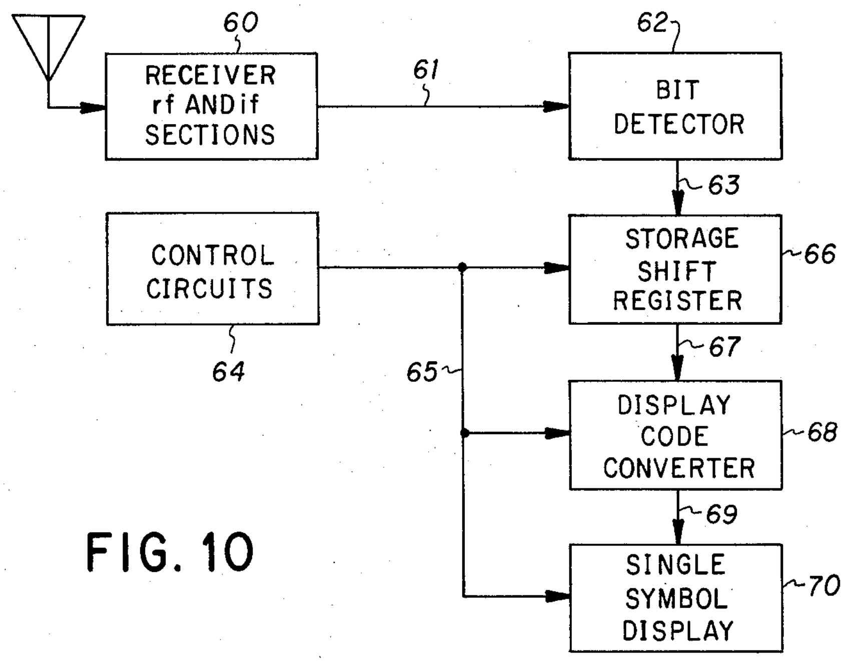
FIG. 10 is a functional diagram of code receiving system as might be employed in the present invention.

The aforegoing description has been concerned with the transmission of coded signals from a hand held radio to a larger receiving station where larger or more complex equipment might be employed for receiving and interpreting the coded signal. FIG. 10 is a general block diagram of a type of receiving system which might be employed. The signal transmitted in a short coded burst from the previously described transmitter is picked up by an antenna at the receiver and applied to receiver RF and IF section 60 to provide an IF output 61 as input to a bit detector 62. Bit detector 62 detects the individual bits of the received code burst. The detected bits 63 may be serially entered into a storage shift register 66 or may be held in storage until called for. An appropriate control circuitry 64 may apply a control input 65 to the storage shift register 66 and, when a message has been received, the control circuitry 64 might embody an indicator light to inform the operator that he has a message in storage within storage shift register 66. The operator might then activate a "read" button associated with the control circuitry 64 to effect a readout of the first 7 bits out of the storage shift register 66 into a display code converter 68. Display code converter 68 may generate the proper output signal 69 for application to a single symbol display 70. The first received symbol is then displayed at the receiving site.

For each subsequent additional symbol of the received message the operator, upon being informed that a symbol is in storage, may push the "read" button associated with control circuitry 64 and cause the stored message to be read out of storage shift register 66 for subsequent display on the single symbol display 70. The symbols comprising the message may thereby be displayed one at time until the entire message has been presented to the operator. This approach provides a small receiver unit employing only a single alphanumeric display element, thus making it quite compatible with hand held receiving equipment. Automatic timing to present each symbol at a suitable rate might replace the manual operation of the "read" button if desired. Although the above-described system has been described in terms of a 7-bit start-stop teleprinter code, the system is quite compatible with a 5-bit code if the synchronizing word is included at the beginning of the message instead of the synchronizing bit at the beginning and end of each symbol as defined by standard start-stop teleprinter code.

The present invention is thus seen to provide a practical means for embodiment in hand held radio equipment for transmission of alpha-numeric information in short coded bursts, each burst lasting only a fraction of a second and occupying no more bandwidth than a voice channel. Small arrays of keys, each key providing selection of four symbols, provide a convenience means for effecting transmission from hand held radios. A single alpha-numeric display element to display the received message one symbol at a time with the timing chosen by the receiving operator provides for convenient reception of the coded message using hand held radio receivers. The system has additionally been defined as providing transmission from hand held radios compatible with standard teleprinter receiving systems employing standard teleprinter hard copy readout devices at the receiver site.

Although the present invention has been described in detail with reference to a particular embodiment thereof, it is not to be so limited, as changes might be made therein which fall within the scope of the invention as defined in the appended claims.

I claim:

1. A binary code transmission system comprising a keyboard means including a plurality of key members, each of said key members being selectively depressable to one of a plurality of positions to select each of an assigned plurality of characters to be transmitted, a read-only memory means including means to store an assigned multi-bit code word therein for each of said plurality of characters to be transmitted, addressing means responsive to each depression of said key members to effect readout of the stored multi-bit code word assigned to that key depression, transmitter means including a transmitter modulator means, control means responsive to said keyboard depressions to activate said transmitter means, said transmitter modulator means receiving said stored code word readout from said read-only memory and developing in response thereto a corresponding modulating waveform, said transmitter means being responsive to said modulating waveform to transmit a carrier wave signal modulated in accordance therewith, said control means including means responsive to the completion of the readout of the last bit of predetermined coded message addressed from said read-only memory to deactivate said transmitter means; said control means comprising a source of clock pulses, logic means receiving said clock pulses and being responsive to said keyboard depressions to apply said clock pulses to said read-only memory to effect a serial readout from said read-only memory of said multi-bit code word assigned to that key depression, said read out being effected at a rate defined by said clock pulses, and said logic means comprising means to inhibit application of said clock pulses to said read-only memory upon application thereto of a number of clock pulses corresponding in number to the number of bits comprising each said multi-bit code word; said multibit code words comprising a plurality of $2^N-1$ bits each, said logic means comprising an N bit continuous binary counter having a rest state exhibiting a binary zero count therein, gating means responsive to said key depressions to effect a binary one count in said counter, and logic gating means responsive to a count in said counter other than said binary zero count to gate said clock pulses to said read-only memory means and to the input of said counter, whereby $2^N-1$ clock pulses are applied to said read-only memory in response to each of said key depressions.

2. A transmitting system as defined in claim 1 wherein each said key depression generates a binary one logic level, means for applying said binary one logic level to said logic means, said logic means comprising an AND gate receiving said clock pulses and key depression generated binary one logic level as respective first and second inputs thereto, an OR gating means receiving the respective bit outputs of said N bit counter, the output of said OR gating means applied as a third input to said AND gate, a further OR gating means receiving said key depression generated binary one logic level, and the output of said AND gate as respective inputs thereto, the output of said further OR gating means being applied as input to said binary counter, and the output of said AND gate comprising $2^N-1$ consecutive clock pulses for application to said read-only memory means.

3. A transmitting system as defined in claim 2 wherein said read-only memory means comprises a shift register having a plurality of $2^N-1$ stages, the output of said AND gate being applied as a shift input to said shift register, means responsive to each said key depression to set into the respective stages of said shift register successive binary code word bits assigned to that key depression, the output stage of said shift register exhibiting a serial read out of said stored binary code word upon application of said train of $2^N-1$ clock pulses to said shift register.

4. A transmitting system as defined in claim 3 wherein said multi-bit code words comprise teleprinter start-stop code words each comprising a start bit followed sequentially by five character defining bits and terminated by a stop bit, said multi-bit counter comprising a three-bit counter, means responsive to said key depression binary one logic generations to effect predetermined set and reset functions of the first five stages of said shift register to the five character defining bits assigned to each selected character to be transmitted, and means responsive to said three-bit counter exhibiting a count transition from 111 to 000 to set the output stage of said shift register to a predetermined binary level corresponding to said stop bit and the next preceding stage of said shift register to a predetermined binary level corresponding to said start bit.

* * * * *